(12) United States Patent
Kamiya et al.

(10) Patent No.: US 11,856,341 B2
(45) Date of Patent: Dec. 26, 2023

(54) SIGNAL PROCESSING DEVICE AND SIGNAL PROCESSING METHOD

(71) Applicant: SONY GROUP CORPORATION, Tokyo (JP)

(72) Inventors: Koji Kamiya, Tokyo (JP); Shigeru Inoue, Tokyo (JP); Norimasa Ozaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/597,964

(22) PCT Filed: Jul. 8, 2020

(86) PCT No.: PCT/JP2020/026694
§ 371 (c)(1),
(2) Date: Jan. 31, 2022

(87) PCT Pub. No.: WO2021/029165
PCT Pub. Date: Feb. 18, 2021

(65) Prior Publication Data
US 2022/0321854 A1 Oct. 6, 2022

(30) Foreign Application Priority Data
Aug. 9, 2019 (JP) .................................. 2019-147152

(51) Int. Cl.
*H04N 9/82* (2006.01)
*H04N 5/268* (2006.01)
*H04N 5/765* (2006.01)

(52) U.S. Cl.
CPC ........... *H04N 9/8205* (2013.01); *H04N 5/268* (2013.01); *H04N 5/765* (2013.01)

(58) Field of Classification Search
CPC ...... H04N 9/8205; H04N 5/268; H04N 5/765; H04N 23/60
(Continued)

(56) References Cited

U.S. PATENT DOCUMENTS 5,910,825 A * 6/1999 Takeuchi ............... G11B 27/34
348/478
8,208,785 B2 * 6/2012 Yamashita ......... H04N 21/4334
725/87
(Continued)

FOREIGN PATENT DOCUMENTS

CN 106688212 A 5/2017
EP 1187472 A1 3/2002
(Continued)

OTHER PUBLICATIONS

International Search Report and Written Opinion of PCT Application No. PCT/JP2020/026694, dated Aug. 25, 2020, 09 pages of ISRWO.

*Primary Examiner* — Helen Shibru
(74) *Attorney, Agent, or Firm* — CHIP LAW GROUP (57) ABSTRACT

To enable routing control to be easily performed in a video system. Signal output equipment generates and outputs a digital signal for transmission in which the digital signal includes a video signal and a predetermined number of identification information groups related to the video signal. A routing unit outputs an inputted digital signal for transmission to a predetermined signal output unit on the basis of at least any identification information included in the predetermined number of identification information groups.

14 Claims, 8 Drawing Sheets

(58) Field of Classification Search
USPC .......................................................... 386/326
See application file for complete search history.

(56) References Cited

U.S. PATENT DOCUMENTS

| | | | | |
|---|---|---|---|---|
| 2004/0218902 | A1* | 11/2004 | Yanagita | G11B 20/10527 |
| | | | | 348/E5.022 |
| 2006/0204007 | A1* | 9/2006 | Doetzkies | H04L 9/12 |
| | | | | 380/224 |
| 2008/0129861 | A1* | 6/2008 | Choi | H04N 9/641 |
| | | | | 348/E9.037 |
| 2010/0271488 | A1* | 10/2010 | Garcia | H04N 19/46 |
| | | | | 348/180 |
| 2017/0280173 | A1 | 9/2017 | Kure et al. | |

FOREIGN PATENT DOCUMENTS

| | | |
|---|---|---|
| EP | 3176987 A1 | 6/2017 |
| JP | 2000-307647 A | 11/2000 |
| JP | 2011-155701 A | 8/2011 |
| JP | 2017-022545 A | 1/2017 |
| WO | 2001/060059 A1 | 8/2001 |
| WO | 2016/039135 A1 | 3/2016 |
| WO | 2018/021112 A1 | 2/2018 |

* cited by examiner

| ID Group Metadata set | Flag | Item_No | Item_Name | contents (ID) | | | |
|---|---|---|---|---|---|---|---|
| ID Group1 | Flag | Item_1 | CCU MODEL | HDCU4300 | Item_2 | CCU SERIAL | 0G01120023 | Item_3 | CAM MODEL | HDC4300 |
| ID Group2 | Flag | Item_1 | CAM NUMBER | CAM3 | Item_2 | ST NUMBER | ST-5 | Item_6 | SYS NAME | IQCX_TOKYO |
| ID Group3 | Flag | Item_1 | CAMERAMAN | JI-ON.D | Item_3 | ROLE | PC SHOT | | | |
| ID Group4 | Flag | Item_1 | PICK ME ! | HEY PRESTO | Item_6 | REMARK | HOT DAY | | | |

SIGNAL PROCESSING DEVICE AND SIGNAL PROCESSING METHOD

CROSS REFERENCE TO RELATED APPLICATIONS

This application is a U.S. National Phase of International Patent Application No. PCT/JP2020/026694 filed on Jul. 8, 2020, which claims priority benefit of Japanese Patent Application No. JP 2019-147152 filed in the Japan Patent Office on Aug. 9, 2019. Each of the above-referenced applications is hereby incorporated herein by reference in its entirety.

TECHNICAL FIELD

The present technology relates to a signal processing device and a signal processing method, and more particularly relates to a signal processing device or the like suitable for application to a video system or the like of a broadcasting station or the like.

BACKGROUND ART

For example, in a video system such as a conventional broadcasting station described in Patent Document 1 or the like, normally, video routing and the like control switching and distribution of video signals by designating an input terminal and an output terminal of a router or a switcher on the basis of physical wiring of a coaxial cable. In such a video system, when a router/switcher setting needs to be greatly changed in accordance with operation, re-setting of routing control is required.

CITATION LIST

Patent Document

Patent Document 1: International Publication No. 2018/021112

SUMMARY OF THE INVENTION

Problems to be Solved by the Invention

An object of the present technology is to enable routing control to be easily performed in a video system.

Solutions to Problems

A concept of the present technology is
a signal processing device including:
a signal generation unit configured to generate a digital signal for transmission, the digital signal including a video signal and a predetermined number of identification information groups related to the video signal; and
a signal output unit configured to output the digital signal for transmission described above.

In the present technology, the signal generation unit generates a digital signal for transmission, in which the digital signal includes a video signal and a predetermined number of identification information groups related to the video signal. For example, this video signal may be a video signal obtained by image capturing with a camera. For example, the predetermined number of identification information groups may include a group including static information and a group including dynamic information. Furthermore, for example, the identification information group may include any of: information specific to equipment configured to generate a video signal; information to specify the equipment in a system including the equipment; information regarding operation using the system; and information to specify a scene in the operation.

The signal output unit outputs a digital signal for transmission. For example, the digital signal for transmission may be a serial digital signal in an SDI format, and the signal generation unit may insert a predetermined number of identification information groups into an ancillary area of the serial digital signal.

For example, the identification information group may have a header and a predetermined number of items that are pieces of identification information, the header may include an identifier of the identification information group, and the item may include an item number and an item content. In this case, for example, the item may further include an item name. Furthermore, in this case, for example, the header may further include additional information regarding the identification information group.

As described above, in the present technology, a predetermined number of identification information groups related to a video signal are included in a digital signal for transmission including the video signal. In this case, if a router in a subsequent stage has a configuration to change a connection destination on the basis of identification information, the connection destination in the router in the subsequent stage can be changed on a signal output equipment side, and routing control can be easily performed.

Furthermore, another concept of the present technology is
a signal processing device including:
a signal input unit configured to input a digital signal for transmission, the digital signal including a video signal and a predetermined number of identification information groups related to the video signal; and
a routing unit configured to output the digital signal for transmission described above to a predetermined signal output unit on the basis of at least any identification information included in the predetermined number of identification information groups described above.

In the present technology, the signal input unit inputs a digital signal for transmission, in which the digital signal includes a video signal and a predetermined number of identification information groups related to the video signal. The routing unit outputs the digital signal for transmission to a predetermined signal output unit on the basis of at least any identification information included in the predetermined number of identification information groups. For example, a setting unit configured to set a correspondence between identification information used in the routing unit and the signal output unit may be further included.

As described above, in the present technology, a digital signal for transmission is outputted to a predetermined signal output unit on the basis of at least any identification information included in the predetermined number of identification information groups. Therefore, a connection destination in routing can be changed on the signal output equipment side, and routing control can be easily performed.

MODE FOR CARRYING OUT THE INVENTION

Hereinafter, an embodiment for implementing the invention (hereinafter, referred to as an embodiment) will be described. Note that the description will be given in the following order.

1. Embodiment
2. Modification

1. EMBODIMENT

[Configuration Example of Video System]

Figure 1:
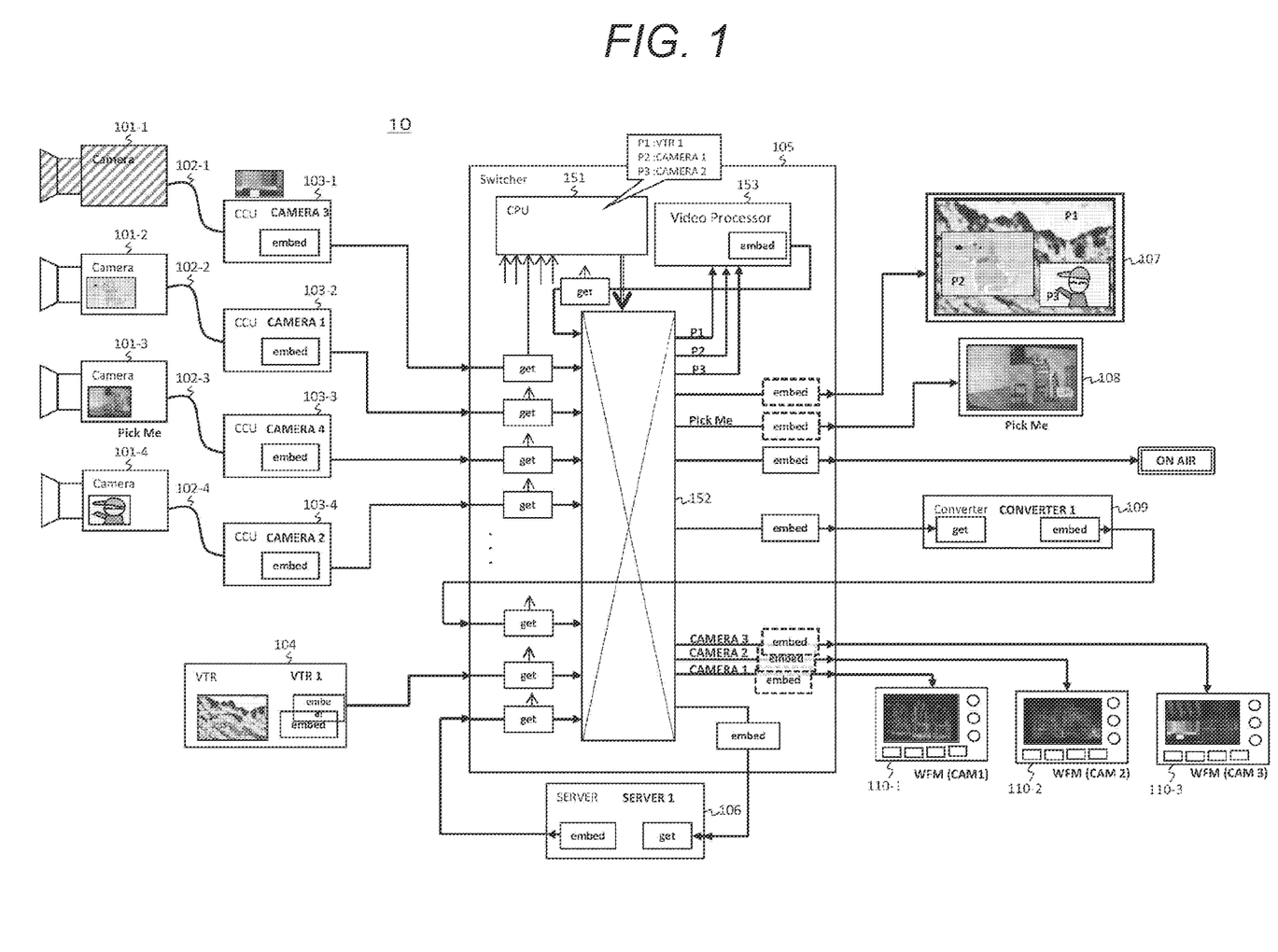
FIG. 1 is a block diagram illustrating a configuration example of a video system as an embodiment.

FIG. 1 illustrates a configuration example of a video system 10 as an embodiment. This video system system 10 includes a plurality of camera devices, which is four camera devices 101-1 to 101-4 in the illustrated example, camera control units (CCUs) 103-1 to 103-4 connected to the camera devices 101-1 to 101-4 via cables 102-1 to 102-4, respectively, and a video tape recorder 104.

Furthermore, this video system 10 includes a switcher 105, a server 106, a monitor 107, a monitor 108, a converter 109, and a plurality of wave form monitors, here, three wave form monitors (WFM) 110-1 to 110-3.

The CCU 103 (103-1 to 103-4) generates and outputs a digital signal for transmission, in which the digital signal includes a video signal supplied from the camera device 101 (101-1 to 101-4) via and cable 102 (102-1 to 102-4). Then, the CCU 103 makes this digital signal for transmission include a predetermined number of identification information groups related to the video signal. In this embodiment, the digital signal for transmission is a serial digital signal (hereinafter, referred to as an "SDI signal" as appropriate) in an SDI format, and a predetermined number of identification information groups are inserted into an ancillary area.

In the illustrated example, "embed" indicates that an identification information group is inserted into the ancillary area of the SDI signal. Note that a portion surrounded by a broken line frame is not necessarily inserted. Furthermore, in the illustrated example, "get" indicates that the identification information group is extracted from the ancillary area of the SDI signal.

Figure 2:
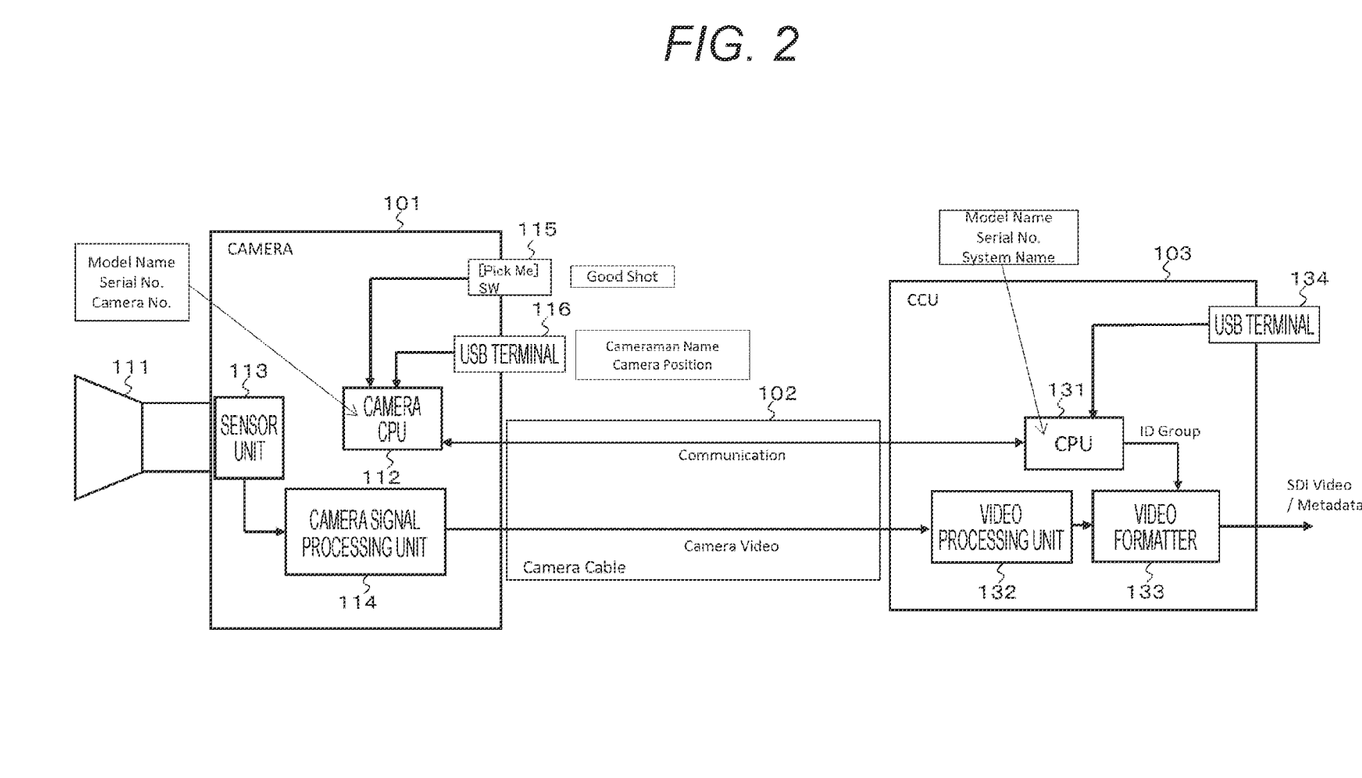
FIG. 2 is a block diagram illustrating a detailed configuration example of a camera device and a CCU.

FIG. 2 illustrates a detailed configuration example of the camera device 101 and the CCU 103. The camera device 101 is connected to the CCU 103 via the cable 102. To the camera device 101, a lens device 111 is connected. The lens device 111 is attached to a lens mount portion in a front portion of the camera device 101.

The camera device 101 includes a camera CPU 112, a sensor unit 113, a camera signal processing unit 114, a pick-me switch (Pick Me SW) 115, and a USB terminal 116.

Furthermore, the CCU 103 includes a CPU 131, a video processing unit 132, a video formatter 133, and a USB terminal 134.

The camera CPU 112 controls an operation of each unit of the camera device 101. This camera CPU 112 communicates necessary signals between with the CPU 131 of the CCU 103. For example, the camera CPU 112 manages information such as a model name, a serial number, and a camera number of the camera device 101, and sends these pieces of information to the CPU 131 of the CCU 103 through a communication line of the cable 102.

Furthermore, for example, the camera CPU 112 acquires information such as a cameraman name and a camera position from a USB memory (not illustrated) attached to the USB terminal 116, and sends these pieces of information to the CPU 131 of the CCU 103 through the communication line of the cable 102. Furthermore, for example, the camera CPU 112 detects that a cameraman performs a pressing operation on the pick-me switch (Pick Me SW) 115 at a time of good shot capturing, and sends a detection signal to the CPU 131 of the CCU 103 through the communication line of the cable 102.

The sensor unit 113 includes an image sensor of HD, 4K, 8K, or the like, for example, and outputs a captured video signal corresponding to a subject. The lens device 111 described above forms an image of a subject on an imaging surface of the image sensor. The camera signal processing unit 114 performs processing such as, for example, gain control, white balance adjustment, and gamma correction on the captured video signal outputted from the sensor unit 113, outputs a camera video signal as an output of the camera device 101, and sends to the video processing unit 132 of the CCU 103 through a video line of the cable 102.

The CPU 131 controls an operation of each unit of the CCU 103. This CPU 131 communicates necessary signals between with the camera CPU 112 of the camera device 101. The video processing unit 132 performs processing such as color correction on a camera video signal transmitted from the camera device 101 through the video line of the cable 102, and outputs the processed video signal.

The video formatter 133 generates and outputs a digital signal for transmission in which the digital signal includes a video signal outputted from the video processing unit 132, here, a serial digital signal (SDI signal) of the SDI format.

The CPU 131 manages information such as a model name, a serial number, and a system name of the CCU 103. Furthermore, on the basis of these pieces of information and the information transmitted from the camera device 101 as described above, the CPU 131 generates a predetermined number of identification information groups (ID Groups) related to the video signal outputted from the video processing unit 132. The video formatter 133 inserts the predetermined number of identification information groups into the ancillary area of the SDI signal. Therefore, together with the video signal, the SDI signal outputted from the video formatter 133 includes the predetermined number of identification information groups related to the video signal.

"Identification Information Group"

An identification information group will be described. The identification information group is a structure of metadata for handling a plurality of pieces of identification information (IDs) related to a video signal, and each piece of identification information is defined as an item for identifying the video signal. A plurality of pieces of identification information can be handled in one identification information group, and further, a plurality of identification information groups can be handled.

Furthermore, a plurality of identification information groups and a plurality of pieces of identification information belonging to each group can be operated at the same time, and may be selectively used depending on a purpose. In this case, it is not necessary to operate all the identification information, and it is sufficient to operate the identification information as metadata of necessary identification information (item).

Dividing into the plurality of identification information groups is for facilitating the operation, by dividing in accordance with a meaning and a purpose of the identification information (item). Definition of each identification information group and definition of the identification information (item) belonging to the group are defined in advance and operated as a common rule, in the system for the operation.

An identification information group X (ID Group X) is defined as an identification information group metadata configuration (ID Group Metadata Structure), and a plurality of identification information groups is operated together with a video signal as an identification information group metadata configuration set (ID Group Metadata Structure Set).

Figure 3:
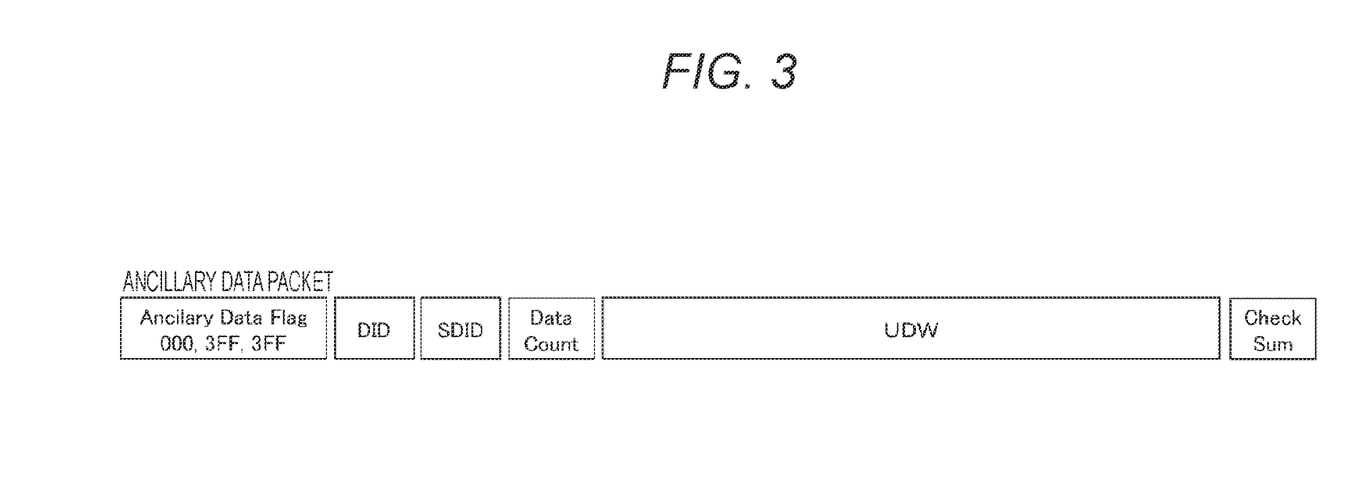
FIG. 3 is a diagram illustrating a configuration example of an ancillary data packet.

When inserted into the ancillary area of the SDI signal, the identification information group metadata configuration is arranged in a user data word (UDW) portion of an ancillary data packet (ANC packet). FIG. 3 illustrates a configuration example of the ancillary data packet. This ancillary packet includes an auxiliary data flag (ADF) indicating the beginning of a packet, a data ID (DID), a secondary data ID (SDID), a data count (Data Count) indicating an amount of user data, a user data word (UDW) of up to 255 words, and a checksum (Check Sum).

Figure 4A:
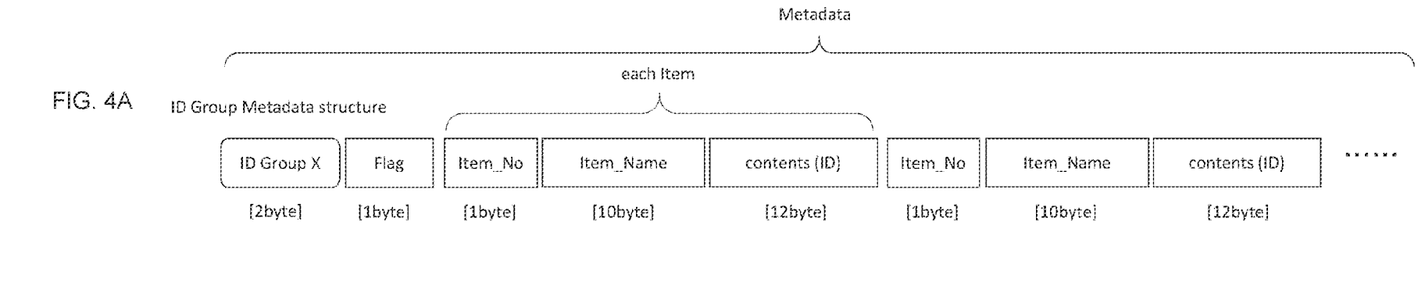
FIGS. 4A and 4B are diagrams illustrating an example of an identification information group metadata configuration (ID Group Metadata Structure).

FIG. 4A illustrates an example of the identification information group metadata configuration (ID Group Metadata Structure). The identification information group metadata has, as a header, an identifier "ID Group X" as metadata and additional information "Flag" for the identifier. The additional information "Flag" will be described later.

"Length" indicating a length (a number of items) of the metadata uses a value defined in the ancillary data packet (see FIG. 3) as "Data Count" indicating a total amount of content. Each item includes an item number (Item No), an item name (Item Name), and an item content (contents (ID)). Note that it is not necessary to add all the defined items, and it is sufficient to add only necessary items.

Figure 4B:
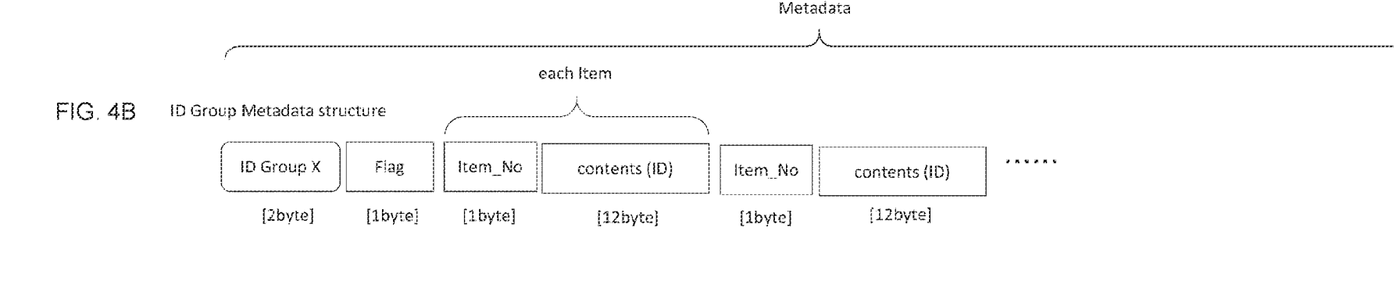

Since each item is defined in the system for the operation, the item number and the item name explicitly coincide with each other. Therefore, as illustrated in FIG. 4B, it is also possible to define and operate with a configuration not including the item name, as the identification information group metadata configuration. Whether or not to add the item name is determined when the item is defined.

Figure 5:
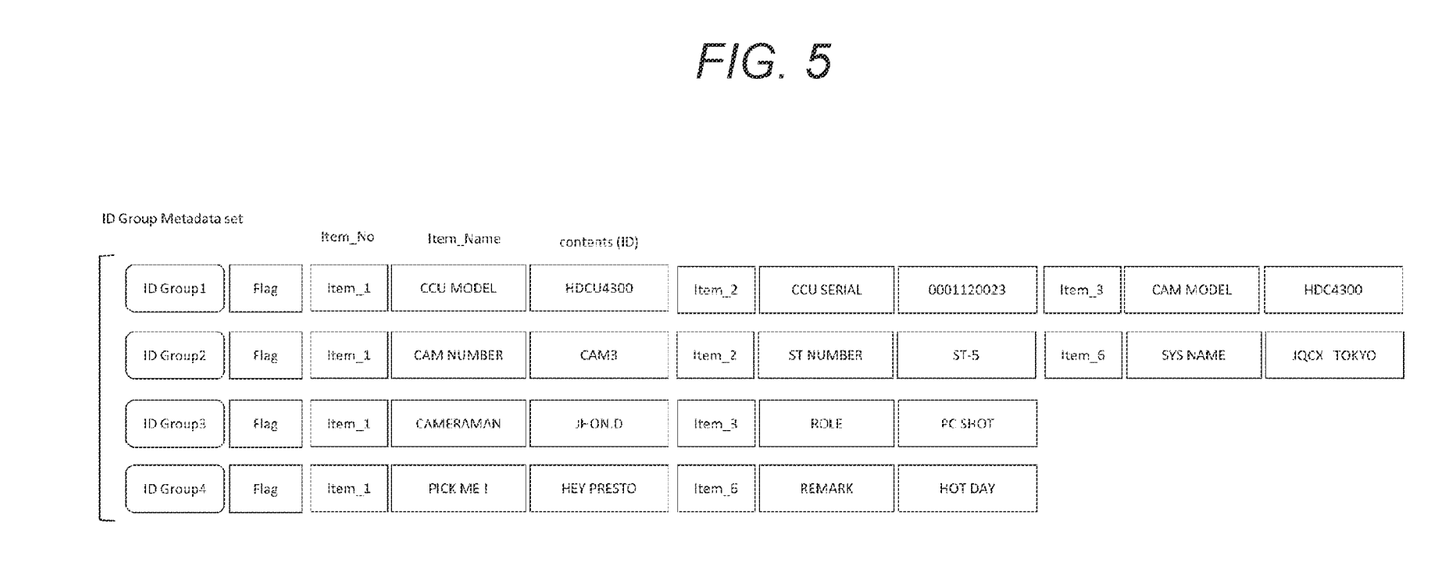
FIG. 5 is a diagram illustrating an example of an identification information group metadata configuration set (ID Group Metadata Structure Set).

FIG. 5 illustrates an example of the identification information group metadata configuration set (ID Group Metadata Structure Set). This example includes four identification information group metadata configurations. For each identification information group, a meaning of the group is different, and items according to rules of individual identification information groups are operated.

A sequence (number) of each identification information group may have a meaning between the groups, or may be independent with no relationship at all. For example, when four identification information groups are defined, the definition can be made such that the identification information (item) belonging to the group is more universal and less variable (static) as the group number becomes smaller, while the variability of the identification information (item) becomes higher (dynamic) as the group number becomes larger.

Figure 6:
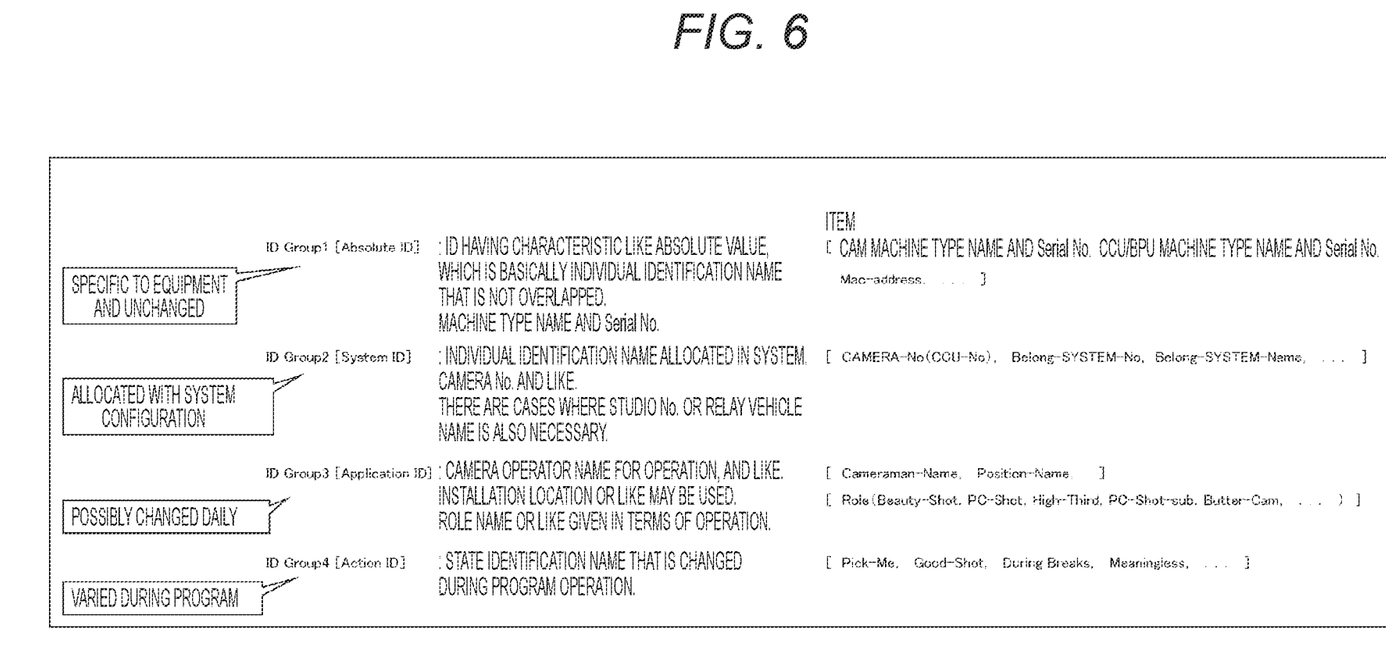
FIG. 6 is a view illustrating a configuration example of four (four-layer) identification information groups in a case of a broadcast camera.

FIG. 6 illustrates a configuration example of four (four-layer) identification information groups in a case of a broadcast camera. Here, an identification information group 1 (ID Group 1) and an identification information group 2 (ID Group 2) are defined as examples of static groups, and an identification information group 3 (ID Group 3) and an identification information group 4 (ID Group 4) are defined as examples of dynamic groups. The identification information group (ID Group 1) is identification information having a characteristic like an absolute value, and is basically a solid identification name indicating equipment-specific information that is not overlapped, and includes a machine type name (model name), a serial number, and the like. The identification information group 2 (ID Group 2) is information regarding a system configuration to be allocated in the system, is an individual identification name indicating information to specify equipment in the system (for example, a plurality of cameras that is jointly operated), and includes a camera number and the like. There are cases where a studio number or a relay vehicle name is also necessary.

The identification information group 3 (ID Group 3) is information regarding operation that changes for every program operation, for example, daily, and includes a cameraman name for the operation. An installation location or the like may be used. Furthermore, a role name or the like given in terms of the operation may be used. The identification information group 4 (ID Group 4) is information to specify a scene that dynamically changes during the program operation, and includes a state identification name and the like.

Items [a machine type name, a serial number, a camera number, and the like] belonging to the identification information group 1 (ID Group 1) and the identification information group 2 (ID Group 2) are added as metadata on the basis of information managed and set by the CPUs in the camera 101 and the CCU 103.

Furthermore, a system name such as a studio number or a relay vehicle number, a broadcast station name, a cameraman name, a camera installation position, an image capturing role, and the like] belonging to the identification information group (ID Group 2) and the identification information group 3 (ID Group 3) are inputted from, for example, an external input (a USB memory, direct input through menu setting, or the like) to the camera 101 and the CCU 103, and are added as metadata.

Furthermore, as an item belonging to the identification information group 4 (ID Group 4), metadata indicating state data of a video image is added in accordance with switch input performed by a cameraman or the like when the cameraman or the like desires to set a flag on the video image, such as an unexpected video image in the image capturing program.

The additional information "Flag" will be described. The "Flag" is additional information regarding metadata itself in handling the metadata. "History Flag bit" may be defined in the "Flag" information. This "History Flag bit" indicates whether or not it is history information. "0" indicates current live information, and "1" indicates history information.

Figure 7:
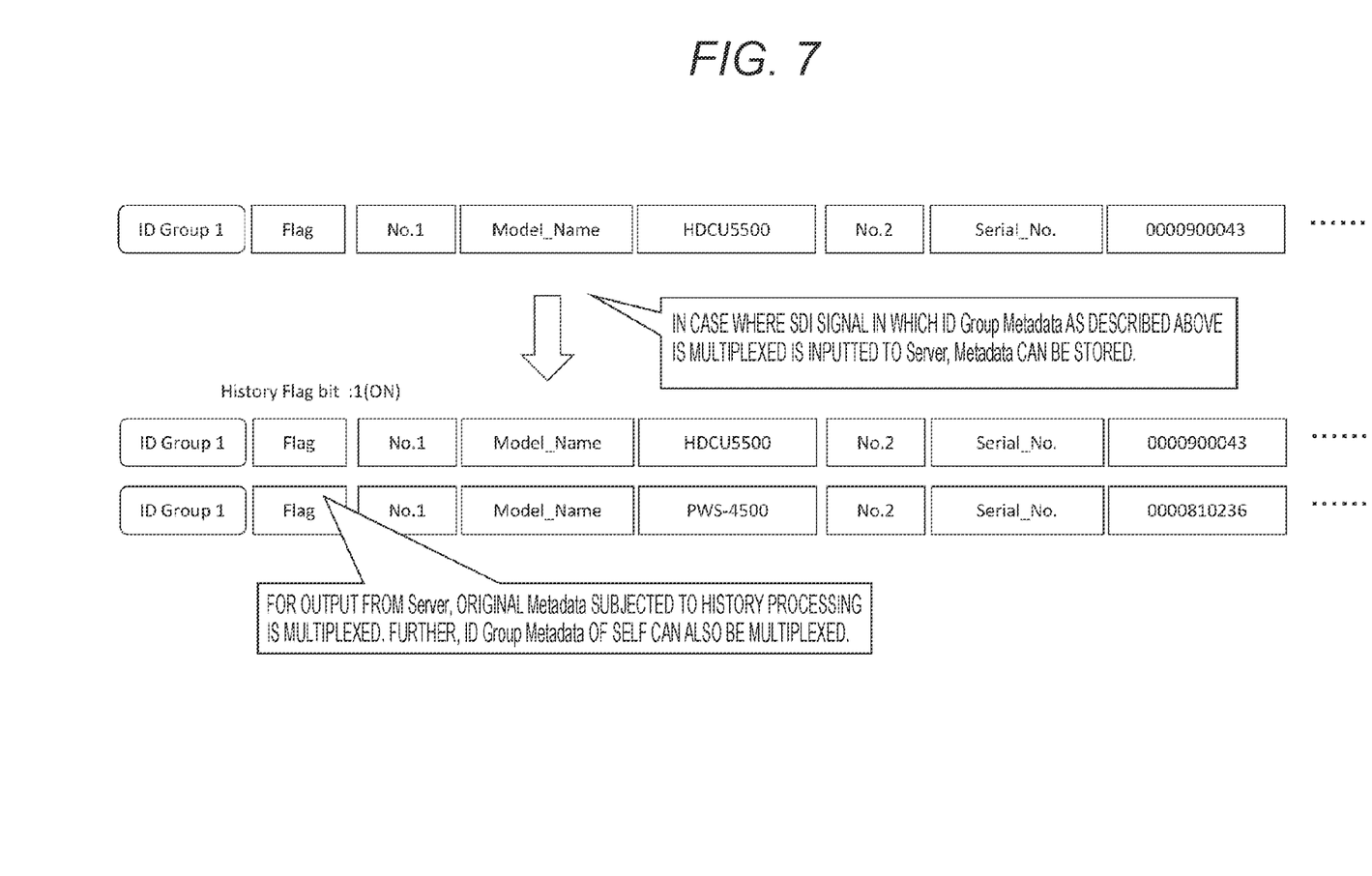
FIG. 7 is a diagram for explaining "History Flag bit" as additional information "Flag".

For example, in the video system 10 illustrated in FIG. 1, for example, the server 106 can multiplex and output the inputted identification information group metadata again as illustrated in FIG. 7 when reproducing an SDI signal that is once recorded. Therefore, in a case where an SDI signal in which the identification information group metadata is multiplexed is inputted, the same metadata is duplicated, and two or more kinds of signals having the same metadata can exist on streaming of the SDI.

In order to avoid this state, the identification information group metadata can be divided into live information and history information by deleting metadata or performing history processing of setting "History Flag bit" in order to output the SDI again, in a signal that has passed through another machine type.

Note that, as flag information other than "History Flag bit", "Instancy Flag bit" as immediate information, "Repetition Flag bit" indicating continuity of metadata, or the like may also be defined. In this case, the "Instancy Flag bit" indicates that a temporal meaning for the very timing at which the metadata is attached is valid. Furthermore, the "Repetition Flag bit" indicates whether or not the metadata is to be multiplexed sporadically while general metadata is often multiplexed every V.

Returning to FIG. 1, the video tape recorder 104 outputs an SDI signal including a video signal at a time of reproduction. Into this SDI signal as well, a predetermined number of identification information groups related to the video signal included in the SDI signal are inserted, similarly to the SDI signals outputted from the above-described CCUs 103-1 to 103-4.

The switcher 105 receives SDI signals outputted from the CCUs 103-1 to 103-4 and the video tape recorder 104. Note that, in the illustrated example, the camera device 101-1 is in a power-off state, and thus the SDI signal outputted from the CCU 103-1 includes a video signal as a test signal.

The switcher 105 outputs an SDI signal for image display to the monitor 107 and the monitor 108, outputs an SDI signal for on-air, and outputs a predetermined SDI signal to the wave form monitors 110-1 to 110-3.

Furthermore, the switcher 105 outputs a predetermined SDI signal to the converter 109. The SDI signal inputted to the converter 109 is subjected to convert processing, and then becomes an input to the switcher 105 again. In the converter 109, the identification information group is extracted from the ancillary area of the SDI signal at the time of input, and the identification information group is inserted into the ancillary area of the SDI signal again at the time of output.

Furthermore, the switcher 105 outputs a predetermined SDI signal to the server 106. Furthermore, the SDI signal reproduced by the server 106 is to be an input to the switcher 105. In the server 106, the identification information group is extracted from the ancillary area of the SDI signal at the time of input, and the identification information group is inserted into the ancillary area of the SDI signal at the time of output.

The switcher 105 includes a CPU 151, a router 152, and a video processor 153. The CPU 151 controls an operation of each unit of the switcher 105. SDI signals inputted from the CCUs 103-1 to 103-4 and the video tape recorder 104 to the switcher 105 are inputted to the router 152. Furthermore, SDI signals inputted from the converter 109 and the server 106 to the switcher 105 are inputted to the router.

Furthermore, a predetermined SDI signal outputted from the router 152 is inputted to the video processor 153, and an SDI signal obtained after processing by the video processor 153 is inputted to the router 152. In this way, in the SDI signal outputted from the video processor 153, the identification information group is inserted into the ancillary area.

From the ancillary area of each SDI inputted to the router 152, the identification information group that is individually inserted is extracted, and the extracted information is sent to the CPU 151. The CPU 151 determines an output destination of each SDI signal inputted to the router 152 on the basis of the identification information group included in each SDI signal, and controls the router 152 on the basis of a determination result. This configuration brings a state where an appropriate SDI signal is outputted to each output unit of the router 152.

In this case, the CPU 151 determines the output destination of each SDI signal on the basis of, for example, a correspondence table, which is set in advance by a user operation, between identification information and an output destination, and controls the router 152. For example, in the illustrated example, a correspondence table is set in which output units P1, P2, and P3 of the router 152 to supply SDI signals to the video processor 153 are associated with the identification information of "VTR 1", "CAMERA 1", and "CAMERA 2". Therefore, the CPU 151 controls routing of the router 152 such that an SDI signal from the video tape recorder 104, an SDI signal from the camera device 103-2, and an SDI signal from the camera device 103-4 are outputted to the output units P1, P2, and P3 of the router 152, respectively.

Furthermore, for example, although a description of the correspondence table is omitted, the CPU 151 controls the router 152 such that an SDI signal from the camera device 103-2, an SDI signal from the camera device 103-4, and an SDI signal from the camera device 103-1 are outputted respectively to output units of the router 152 to which the wave form monitors 110-1, 110-2, and 110-3 are connected, on the basis of identification information of a camera No. included in the identification information group 2.

Furthermore, for example, although a description of the correspondence table is omitted, the CPU 151 controls the router 152 such that an SDI signal having identification information of Pick Me included in the identification information group 4 is outputted to an output unit of the router 152 to which the monitor 108 is connected. This configuration brings a state where a captured image of the camera device 101 in which the cameraman presses the pick-me switch (Pick Me SW) 115 is displayed in the monitor 108. Furthermore, the CPU 151 can also control the router 152 such that an SDI signal having identification information of Pick Me in the identification information group 4 is outputted to an output unit of the router 152 to which a storage (not illustrated) is connected. As a result, a captured image of the camera device 101 in which the cameraman presses the pick-me switch (Pick Me SW) 115 is recorded in the storage.

Furthermore, for example, although a description of the correspondence table is omitted, the CPU 151 controls the router 152 such that an SDI signal obtained by the video processor 153 is outputted to an output unit of the router 152 to which the monitor 107 is connected, on the basis of a role name (for example, information indicating the output unit (P1, P2, and P3)) included in the identification information group 3. This configuration brings a state where a processed image based on the SDI signal obtained by the video processor 153, that is, a picture-in-picture image in the illustrated example, is displayed on the monitor 107.

Furthermore, for example, although a description of the correspondence table is omitted, the CPU 151 controls the router 152 such that an SDI signal obtained by the video processor 153 is outputted to an output unit of the router 152 that is to output an SDI signal for on-air. This configuration brings a state where the SDI signal obtained by the video processor 153 is outputted as the SDI signal for on-air.

Figure 8:
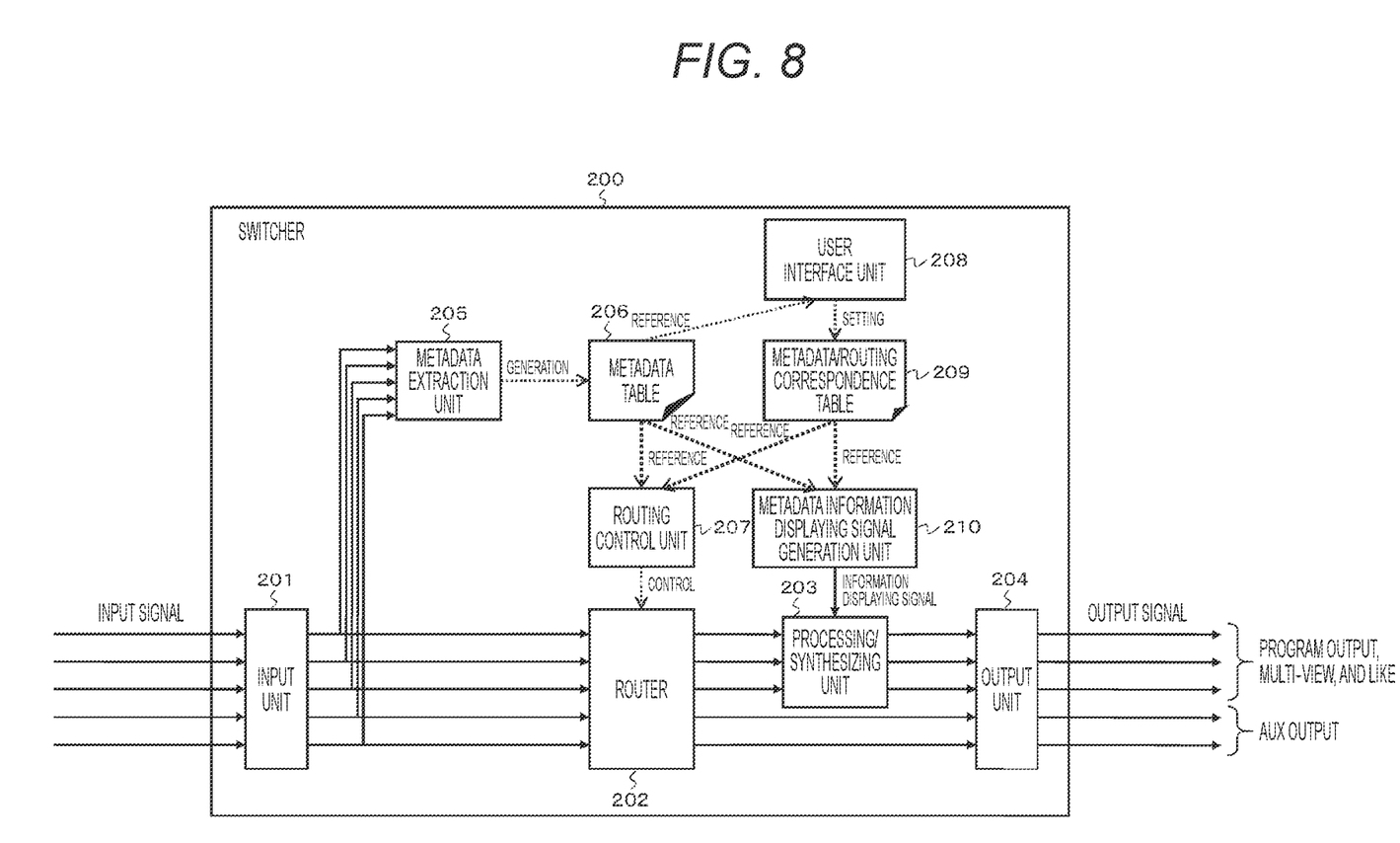
FIG. 8 is a diagram for explaining a basic configuration of a switcher according to the present technology.

FIG. 8 illustrates a configuration example of a switcher 200 that is the basis of the switcher 105 described above.

This switcher 200 includes an input unit 201, a router 202, a processing/synthesizing unit 203, an output unit 204, a metadata extraction unit 205, a metadata table 206, a routing control unit 207, a user interface unit 208, a metadata/routing correspondence table 209, and a metadata information displaying signal generation unit 210.

The input unit 201 receives a plurality of SDI signals from a camera device, a video tape recorder, and the like. Each SDI signal includes a video signal and a predetermined number of identification information groups (metadata) related to the video signal. The plurality of SDI signals is individually inputted to a plurality of input terminals of the router 202.

The metadata extraction unit 205 extracts metadata of the predetermined number of identification information groups inserted in the ancillary area, from SDI signals inputted to the plurality of input terminals of the router 202. In this way, the metadata table 206 is generated on the basis of the metadata extracted from each SDI signal. In this metadata table 206, metadata extracted from that of the SDI signal inputted to each of the plurality of input terminals of the router 202 is associated.

The user interface unit 208 refers to the metadata table 206 and sets the metadata/routing correspondence table 209. This metadata/routing correspondence table 209 is a table indicating which output terminal of the router 202 the SDI signal having which identification information (item) is outputted to.

The routing control unit 207 refers to the metadata table 206 and the metadata/routing correspondence table 209, and controls the router 202. As a result, an SDI signal as set in the metadata/routing correspondence table 209 is obtained for each of the plurality of output terminals of the router 202.

This function allows the plurality of SDI signals inputted to the router 202 to be automatically distributed and outputted in accordance with the identification information (item) included in the plurality of SDI signals, by previously setting the metadata/routing correspondence table 209 according to an output purpose, and thus it is possible to greatly simplify the setting for each operation.

The processing/synthesizing unit 203 inputs the SDI signals obtained for a predetermined number of output terminals of the router 202, performs a processing/synthesizing process on the SDI signals, and outputs a predetermined number of processed SDI signals. The metadata information displaying signal generation unit 210 refers to the metadata table 206 and the metadata/routing correspondence table 209, generates an information displaying signal for displaying information based on contents of these tables, and supplies to the processing/synthesizing unit 203. As a result, an SDI signal having a video signal on which the information displaying signal is superimposed is obtained as one of the SDI signals outputted from the processing/synthesizing unit 203.

The output unit 204 outputs a plurality of SDI signals outputted from the processing/synthesizing unit 203 and the router 202.

As described above, in the video system 10 illustrated in FIG. 1, a plurality of SDI signals including a video signal that is inputted to the switcher 105 includes a predetermined number of identification information groups related to the video signal as metadata, and the switcher 105 controls routing on the basis of the metadata included in each SDI signal. The connection destination in the switcher can be changed on the output equipment side of the SDI signal, and routing control can be easily performed.

2. MODIFICATION

Note that, although not described above, the present technology can be similarly applied to a video system that transmits a video signal with an IP packet.

Furthermore, although the preferred embodiment of the present disclosure has been described above in detail with reference to the accompanying drawings, the technical scope of the present disclosure is not limited to such an example. It is obvious that those with ordinary skill in the technical field of the present disclosure can arrive various variations or modifications within the scope of the technical idea described in the claims, and it is naturally understood that these also fall within the technical scope of the present disclosure.

Furthermore, the effects described in the present specification are merely exemplary or illustrative, and not restrictive. That is, the technology according to the present disclosure can exhibit other effects apparent to those skilled in the art from the description of the present specification, in addition to the effect described above or instead of the effect described above.

Furthermore, the present technology can also have the following configurations.

(1) A signal processing device including:
a signal generation unit configured to generate a digital signal for transmission, the digital signal including a video signal and a predetermined number of identification information groups related to the video signal; and
a signal output unit configured to output the digital signal for transmission described above.

(2) The signal processing device according to (1) described above, in which
the predetermined number of identification information groups described above include a group including static information and a group including dynamic information.

(3) The signal processing device according to (1) or (2) described above, in which
each of the identification information groups described above includes any of: information specific to equipment configured to generate the video signal described above; information to specify the equipment in a system including the equipment described above; information regarding operation using the system described above; and information to specify a scene in the operation described above.

(4) The signal processing device according to any one of (1) to (3) described above, in which
the digital signal for transmission described above is a serial digital signal in an SDI format, and
the signal generation unit described above inserts the predetermined number of identification information groups described above into an ancillary area of the serial digital signal described above.

(5) The signal processing device according to any one of (1) to (4) described above, in which
each of the identification information groups described above includes a header and a predetermined number of items that are pieces of identification information,
the header described above includes an identifier of each of the identification information groups described above, and each of the items described above includes an item number and an item content.

(6) The signal processing device according to (5) described above, in which
each of the items described above further includes an item name.

(7) The signal processing device according to (5) or (6) described above, in which
the header described above further includes additional information regarding each of the identification information groups described above.

(8) The signal processing device according to any one of (1) to (7) described above, in which
the video signal described above is a video signal obtained by image capturing with a camera.

(9) A signal processing method including:
a procedure of generating a digital signal for transmission, the digital signal including a video signal and a predetermined number of identification information groups related to the video signal; and
a procedure of outputting the digital signal for transmission described above.

(10) A signal processing device including:
a signal input unit configured to input a digital signal for transmission, the digital signal including a video signal and a predetermined number of identification information groups related to the video signal; and
a routing unit configured to output the digital signal for transmission described above to a predetermined signal output unit on the basis of at least any identification information included in the predetermined number of identification information groups described above.

(11) The signal processing device according to (10) described above, in which
the predetermined number of identification information groups described above include a group including static information and a group including dynamic information.

(12) The signal processing device according to (10) or (11) described above, in which
each of the identification information groups described above includes any of: information specific to equipment configured to generate the video signal described above; information to specify the equipment in a system including the equipment described above; information regarding operation using the system described above; and information to specify a scene in the operation described above.

(13) The signal processing device according to any one of (10) to (12) described above, further including:
a setting unit configured to set a correspondence between identification information used in the routing unit described above and a signal output unit.

(14) A signal processing method including:
a procedure of inputting a digital signal for transmission, the digital signal including a video signal and a predetermined number of identification information groups related to the video signal; and
a procedure of outputting the digital signal for transmission described above to a predetermined signal output unit on the basis of at least any identification information included in the predetermined number of identification information groups described above.

REFERENCE SIGNS LIST

10 Video system
100 Camera device
101, 101-1 to 101-4 Camera device
102, 102-1 to 102-4 Cable
103, 103-1 to 103-4 CCU
104 Video tape recorder
105 Switcher
106 Server
107, 108 Monitor
109 Converter
110-1 to 110-3 Wave form monitor
111 Lens device
112 Camera CPU
113 Sensor unit
114 Camera signal processing unit
115 Pick-me switch
116 USB terminal
131 CPU
132 Video processing unit
133 Video formatter
134 USB terminal
151 CPU
152 Router
153 Video processor
200 Switcher
201 Input unit
202 Router
203 Processing/synthesizing unit
204 Output unit
205 Metadata extraction unit
206 Metadata table
207 Routing control unit
208 User interface unit
209 Metadata/routing correspondence table
210 Metadata information displaying signal generation unit

The invention claimed is:

1. A signal processing device, comprising:
a signal generation unit configured to generate a digital signal for transmission, wherein
the digital signal including a video signal and a specific number of identification information groups related to the video signal,
an identification information group of the specific number of identification information groups corresponds to an identification information group metadata configuration, and
the identification information group metadata configuration is arranged in a user data word portion of an ancillary data packet in an ancillary area of serial digital signal; and
a signal output unit configured to output the digital signal for transmission.

2. The signal processing device according to claim 1, wherein
the specific number of identification information groups include a group including static information and a group including dynamic information.

3. The signal processing device according to claim 1, wherein
each identification information group of the specific number of identification information groups includes at least one of information specific to equipment configured to generate the video signal, information to specify the equipment in a system including the equipment, information regarding operation using the system, and information to specify a scene in the operation.

4. The signal processing device according to claim 1, wherein the digital signal for transmission is the serial digital signal in an SDI format, and the signal generation unit is further configured to insert the specific number of identification information groups into the ancillary area of the serial digital signal.

5. The signal processing device according to claim 1, wherein each of the identification information groups includes a header and a specific number of items that are pieces of identification information, the header includes an identifier of each of the identification information groups, and each of the items includes an item number and an item content.

6. The signal processing device according to claim 5, wherein each of the items further includes an item name.

7. The signal processing device according to claim 5, wherein the header further includes additional information regarding each of the identification information groups.

8. The signal processing device according to claim 1, wherein the video signal is a video signal obtained by image capturing with a camera.

9. A signal processing method, comprising:

generating a digital signal for transmission, wherein
the digital signal including a video signal and a specific number of identification information groups related to the video signal, an identification information group of the specific number of identification information groups corresponds to an identification information group metadata configuration, and the identification information group metadata configuration is arranged in a user data word portion of an ancillary data packet in an ancillary area of serial digital signal; and outputting the digital signal for transmission.

10. A signal processing device, comprising:

a signal input unit configured to input a digital signal for transmission, wherein
the digital signal including a video signal and a specific number of identification information groups related to the video signal, an identification information group of the specific number of identification information groups corresponds to an identification information group metadata configuration, and the identification information group metadata configuration is arranged in a user data word portion of an ancillary data packet in an ancillary area of serial digital signal; and a routing unit configured to output the digital signal for transmission to a specific signal output unit based on at least any identification information included in the specific number of identification information groups.

11. The signal processing device according to claim 10, wherein the specific number of identification information groups include a group including static information and a group including dynamic information.

12. The signal processing device according to claim 10, wherein each identification information group of the specific number of identification information groups includes at least one of information specific to equipment configured to generate the video signal, information to specify the equipment in a system including the equipment, information regarding operation using the system, and information to specify a scene in the operation.

13. The signal processing device according to claim 10, further comprising:

a setting unit configured to set a correspondence between identification information used in the routing unit and a signal output unit.

14. A signal processing method, comprising:

inputting a digital signal for transmission, wherein
the digital signal including a video signal and a specific number of identification information groups related to the video signal, an identification information group of the specific number of identification information groups corresponds to an identification information group metadata configuration, and the identification information group metadata configuration is arranged in a user data word portion of an ancillary data packet in an ancillary area of serial digital signal; and outputting the digital signal for transmission to a specific signal output unit based on at least any identification information included in the specific number of identification information groups.

* * * * *